United States Patent
Parpajola

(10) Patent No.: US 11,911,860 B2
(45) Date of Patent: Feb. 27, 2024

(54) NUMERICAL-CONTROL MACHINE TOOL

(71) Applicant: PARPAS S.p.A., Cadoneghe (IT)

(72) Inventor: Vladi Parpajola, Cadoneghe (IT)

(73) Assignee: PARPAS S.P.A., Cadoneghe (IT)

(*) Notice: Subject to any disclaimer, the term of this patent is extended or adjusted under 35 U.S.C. 154(b) by 595 days.

(21) Appl. No.: 17/260,900

(22) PCT Filed: Jul. 1, 2019

(86) PCT No.: PCT/IB2019/055602
§ 371 (c)(1),
(2) Date: Jan. 15, 2021

(87) PCT Pub. No.: WO2020/016689
PCT Pub. Date: Jan. 23, 2020

(65) Prior Publication Data
US 2021/0252654 A1   Aug. 19, 2021

(30) Foreign Application Priority Data

Jul. 16, 2018   (IT) .................. 102018000007230

(51) Int. Cl.
*B23Q 11/00*   (2006.01)
*B23Q 15/14*   (2006.01)
(Continued)

(52) U.S. Cl.
CPC ............ *B23Q 11/001* (2013.01); *B23Q 15/14* (2013.01); *B23Q 17/2233* (2013.01);
(Continued)

(58) Field of Classification Search
CPC ...... B23Q 11/001; B23Q 15/14; B23Q 17/22; B23Q 17/2233; B23Q 2220/006;
(Continued)

(56) References Cited

U.S. PATENT DOCUMENTS 5,834,623 A * 11/1998 Ignagni ................ G05B 19/401
73/1.79
2006/0228182 A1 * 10/2006 Pasquetto ............ B23Q 1/5481
409/235

(Continued)

FOREIGN PATENT DOCUMENTS

CN          2684995 Y  *  1/2004  ......... B23Q 17/2233
CN       104364038 B  *  11/2016  ............. B23C 1/002
(Continued)

OTHER PUBLICATIONS

Ha et al, A Wireless MEMS-Based Inclinometer Sensor Node for Structural Health Monitoring, Sensors 2013, 13, 16090-16104 (Year: 2013).*

(Continued)

*Primary Examiner* — David L Singer
(74) *Attorney, Agent, or Firm* — McCarter & English, LLP

(57) ABSTRACT

A numerical-control machine tool is provided that includes a tool-holder head which is provided with a tool-holder spindle and is capable of rotating/tilting the tool-holder spindle about two different rotation axes inclined to one another; a movable supporting structure that supports the tool-holder head; inclinometer microsensor(s) that are located on the movable supporting structure of the machine to measure/determine the tilt of the element on which the sensors are mounted; and an electronic control device that commands the moving members of the movable supporting structure and of the tool-holder head. The electronic control device is electronically connected to the inclinometer microsensor(s) controls the moving members of the movable supporting structure and of the tool-holder head based on signals arriving from the inclinometer microsensor(s), so as (Continued)

to correct the spatial position and/or the orientation of the tool-holder spindle.

17 Claims, 5 Drawing Sheets

(51) Int. Cl.
  *B23Q 17/22* (2006.01)
  *G05B 19/404* (2006.01)
  *G05B 19/25* (2006.01)

(52) U.S. Cl.
  CPC ......... *G05B 19/251* (2013.01); *G05B 19/404* (2013.01); *B23Q 2220/006* (2013.01); *G05B 2219/49169* (2013.01); *G05B 2219/49186* (2013.01)

(58) Field of Classification Search
  CPC ................ G05B 19/251; G05B 19/404; G05B 2219/49169; G05B 2219/49186
  See application file for complete search history.

(56) References Cited

U.S. PATENT DOCUMENTS

| | | | | |
|---|---|---|---|---|
| 2008/0078075 A1* | 4/2008 | Schrott | ..................... | B23C 1/12 409/201 |
| 2010/0024206 A1* | 2/2010 | Mizuta | ................... | B23Q 1/012 33/534 |
| 2010/0207567 A1* | 8/2010 | Mori | ...................... | B23Q 17/22 318/632 |
| 2012/0271439 A1* | 10/2012 | Yamamoto | ........... | G05B 19/404 700/73 |
| 2013/0028673 A1* | 1/2013 | Onishi | ................... | B23Q 15/18 408/8 |
| 2013/0205947 A1* | 8/2013 | Takahashi | ................ | B23Q 1/52 74/665 B |
| 2015/0122072 A1* | 5/2015 | Wu | .......................... | B23Q 5/10 901/25 |
| 2016/0207157 A1* | 7/2016 | Corletto | ............ | B23Q 3/15722 |
| 2017/0361452 A1 | 12/2017 | Jatekos et al. | | |

FOREIGN PATENT DOCUMENTS

| | | |
|---|---|---|
| EP | 2561956 A1 | 2/2013 |
| EP | 2620825 A1 | 7/2013 |
| JP | 2011121157 | 6/2011 |
| WO | WO 0192825 | 12/2001 |
| WO | WO 2012032423 | 3/2012 |
| WO | WO 2013140383 | 9/2013 |

OTHER PUBLICATIONS

PCT International Search Report and Written Opinion dated Nov. 12, 2019 for PCT/IB2019/055602.

\* cited by examiner

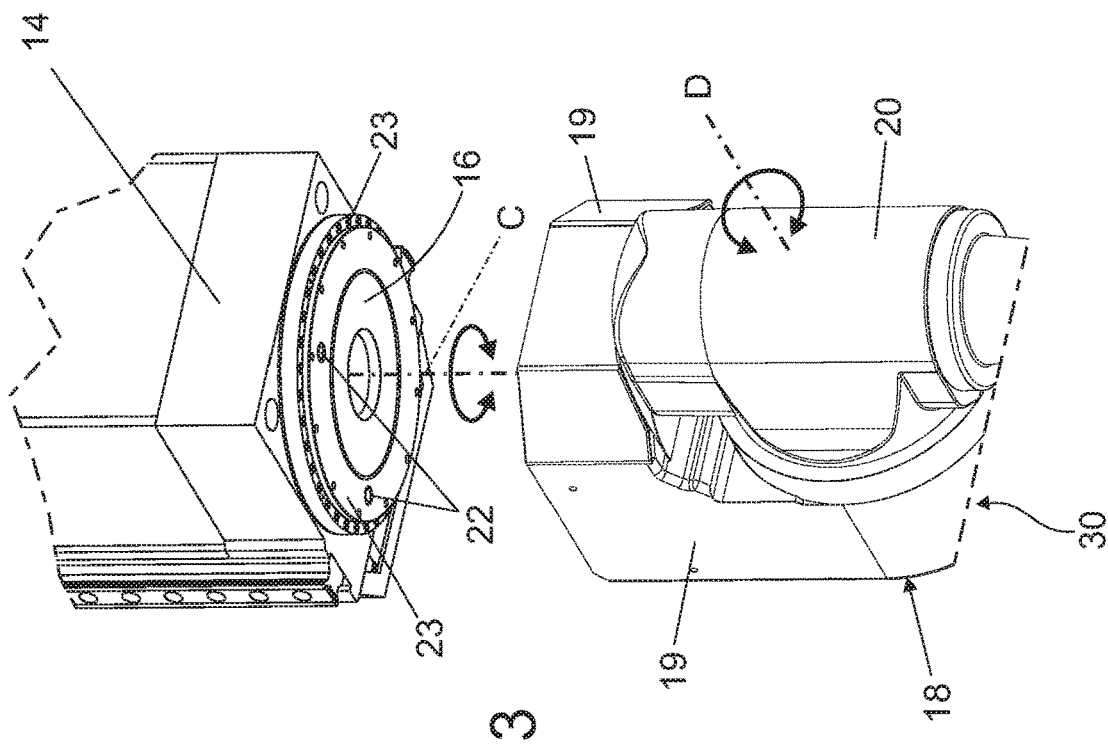
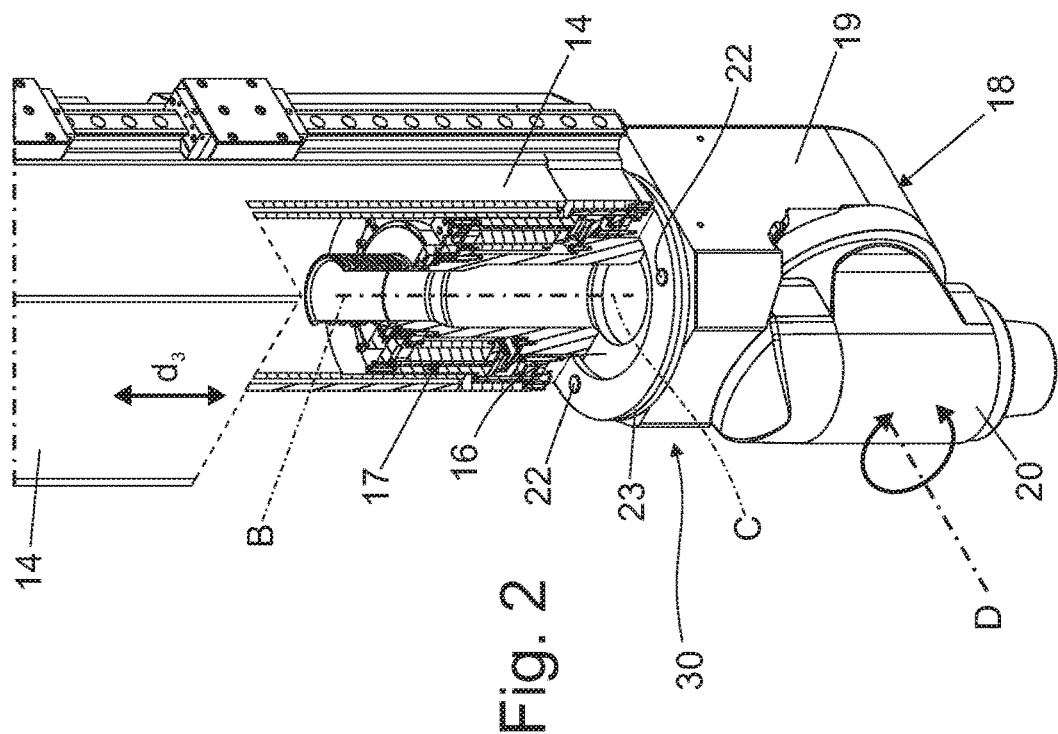

NUMERICAL-CONTROL MACHINE TOOL

CROSS-REFERENCE TO RELATED APPLICATIONS

This patent application is a 35 U.S.C. § 371 National Stage filing of International Application No. PCT/IB2019/055602 filed on Jul. 1, 2019, which application claims priority from Italian patent application no. 102018000007230 filed on Jul. 16, 2018, the entire disclosure of which is incorporated herein by reference.

TECHNICAL FIELD

The present invention relates to a numerical-control machine tool.

More in detail, the present invention relates to a numerical-control bridge milling machine, to which the following disclosure will make explicit reference without however loosing in generality.

BACKGROUND ART

As it is known, numerical-control bridge milling machine usually comprise: a piece-holder platform, on which the piece to be machined is to be laid and fixed; a straight, horizontal support crossbeam with a high-rigidity structure, which extends horizontally above the piece-holder platform, with the two axial ends resting in sliding manner on two lateral raised shoulders projecting from the base, on opposite sides of the piece-holder platform, so as to allow the support crossbeam to move horizontally above the piece-holder platform in a horizontal direction perpendicular to the longitudinal axis of the crossbeam; a movable carriage, which is fixed in axially sliding manner to a lateral flank of the support crossbeam, so as to be able to move along the crossbeam parallel to the longitudinal axis of the crossbeam; a head-holder beam which is fixed to the movable carriage in a vertical position, with the capability of sliding on the movable carriage parallel to its longitudinal axis, i.e. in a vertical direction, so as to be able to vary the distance from the piece-holder platform beneath; and an electrically-operated tool-holder head, which is fixed to the lower end of the head-holder beam, so that its tool-holder spindle can reach the piece to be machined resting stationary on the piece-holder platform beneath.

More in detail, the tool-holder head is usually provided with a tool-holder spindle, which is capable of rotating/tilting about two further reference axes orthogonal to one another, one of which usually coincides with or is parallel to the longitudinal/vertical axis of the head-holder beam.

The aforesaid bridge milling machines are finally provided with an electronic control device, which is adapted to control the moving devices of the crossbeam, of the movable carriage and of the head-holder beam, depending on the signals arriving from a first sensor system that detects the position of crossbeam on the raised lateral shoulders projecting of the base, from a second sensor system that detects the position of the movable carriage on the crossbeam, and—finally—from a third sensor system that detects the position of the head-holder beam on the movable carriage.

Unfortunately, the precision with which the electronic control system of the machine can determine the absolute position of the tool mounted on the tool-holder spindle of the head is limited by the thermal expansions to which the main metal components of the machine are usually subjected.

For this reason, large-sized bridge milling machines are nowadays provided with thermal stabilization systems that limit, as much as possible, the effects caused by the thermal expansions of the main structural supporting elements of the machine.

However, even with these solutions, large-sized bridge milling machines cannot anyway reach machining precisions higher than one hundredth of millimetre.

When the length of the support crossbeam exceeds 3-4 metres, in fact, the errors due to the thermal expansions of the crossbeam and of other large-sized pieces significantly affect the precision with which the control system of the machine can determine the absolute position of the tool being used.

DISCLOSURE OF INVENTION

Aim of the present invention is to remedy the operating limits of today's numerical-control bridge milling machines.

In compliance with these aims, according to the present invention there is provided a numerical-control machine tool as defined in claim 1 and preferably, though not necessarily, in any one of the claims depending on it.

BRIEF DESCRIPTION OF THE DRAWINGS

The present invention will now be described with reference to the accompanying drawings, which show a non-limiting embodiment thereof, wherein:

FIG. 2 is an enlarged-scale view of a portion of the machine tool shown in FIG. 1, with parts in section and parts removed for sake of clarity;

FIG. 3 is a partially exploded, perspective view of the machine-tool portion shown in FIG. 2, with parts removed for sake of clarity; whereas

FIG. 5 is a schematic, front view showing the operation of the machine tool shown in FIG. 1; whereas

BEST MODE FOR CARRYING OUT THE INVENTION

Figure 1:
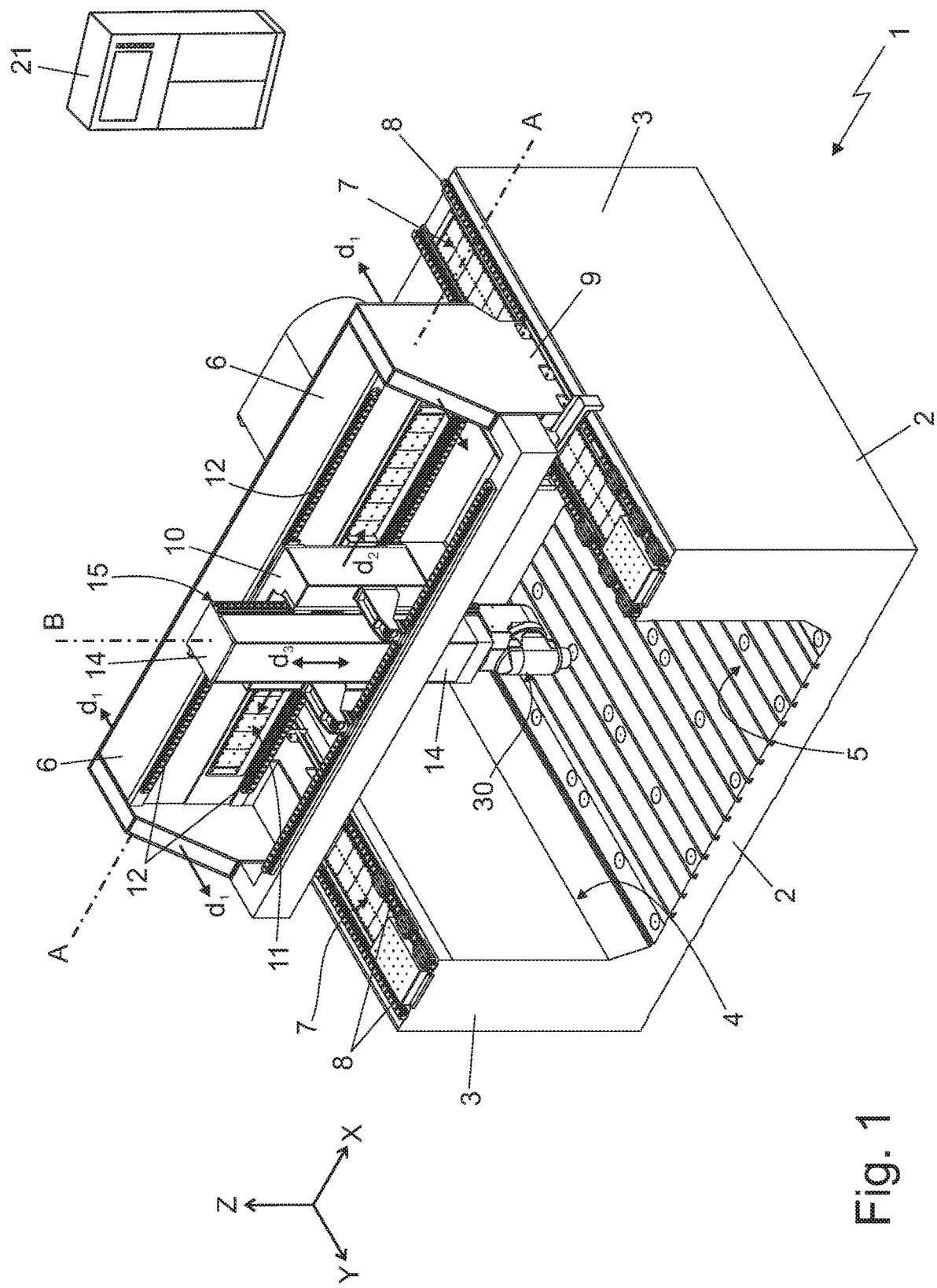
FIG. 1 is an isometric view of a numerical-control machine tool realized according to the teachings of the present invention, with parts removed for sake of clarity.

With reference to FIG. 1, number 1 denotes, as a whole, a numerical-control machine tool that finds particularly advantageous use in the milling or reaming of large-sized metal pieces.

The machine tool 1 basically comprises: a tool-holder head that is provided with a tool-holder spindle capable of holding a generic tool, and that is capable of tilting said tool-holder spindle about two different rotation axes inclined to one another; a movable supporting structure that permanently supports the tool-holder head and is capable of moving, on command, the tool-holder head in the space surrounding the piece to be machined; and an electronic control device that drives/commands the various moving members of the movable supporting structure so as to move the tool-holder head and its spindle in the space around the piece to be machined in order to carry out, in automatic manner, the scheduled machining operation/s.

Preferably, the tool-holder spindle of the head is furthermore a motor-driven spindle, i.e. a spindle capable of driving into rotation of the tool about its longitudinal axis.

In the example shown, in particular, the machine tool 1 preferably comprises: a substantially horizontal, bedplate 2 which is firmly anchored to the ground and is preferably made of metal material; two substantially straight and preferably made of metal material, lateral shoulders 3 that rise/project vertically from the bedplate 2 and horizontally extend on the bedplate 2 side by side, so as to form/delimit a substantially straight, longitudinal corridor 4 that preferably extends astride the vertical midplane of the machine; and a piece-holder platform 5 preferably made of metal material, which is adapted to accommodate, resting thereon, the piece to be machined and is located within the longitudinal corridor 4 laterally delimited by the two lateral shoulders 3.

More in detail, the two lateral shoulders 3 are substantially parallel to one another and extend on the bedplate 2 without interruptions, on opposite sides of the vertical midplane of the machine, preferably while remaining parallel to the sane vertical midplane.

Preferably each lateral shoulder 3 is furthermore substantially parallelepiped in shape.

In the example shown, in addition, the two lateral shoulders 3 are preferably made in one piece with the bedplate 2, so as to form a substantially U-shaped rigid body.

Moreover, the piece-holder platform 5 is preferably made in one piece with the bedplate 2 and is preferably dimensioned so as to take up the entire length of the longitudinal corridor 4.

With reference to FIG. 1, moreover the machine tool 1 in addition also comprises: a substantially straight and preferably made of metal material, large horizontal support crossbeam 6 which extends astride the lateral shoulders 3 substantially horizontally and perpendicularly to the vertical midplane of the machine, and has the two axial ends coupled in axially sliding manner to the two lateral shoulders 3, so as to be able to move along the two lateral shoulders 3, at a given height from the piece-holder platform 5 beneath, in a first horizontal direction $d_1$ substantially parallel to the corridor longitudinal axis and perpendicular to the longitudinal axis A of the same support crossbeam 6; and a first, preferably electrically- or hydraulically-operated, electronically-controlled moving device 7 which is capable of moving, on command, the support crossbeam 6 back and forth along the lateral shoulders 3, in direction $d_1$.

Conventionally, the longitudinal axis A of support crossbeam 6 is moreover substantially parallel to the Cartesian axis X, so that direction $d_1$ is substantially parallel to the Cartesian axis Y.

Furthermore, the longitudinal corridor 4 preferably has a width exceeding 3 metres, therefore the support crossbeam 6 has a length exceeding 3 metres.

With reference to FIG. 1, in the example shown, in particular, the machine tool 1 preferably has, at the top of each lateral shoulder 3, at least one and preferably a pair of straight rails 8 that extend horizontally and parallel to the longitudinal axis of corridor 4, i.e. parallel to Cartesian axis Y and to the vertical midplane of the machine, preferably substantially for the whole length of lateral shoulder 3.

Preferably, each axial end of support crossbeam 6, on the other hand, is preferably provided with a resting slide-block 9, which is fitted/rests in axially sliding manner directly on the straight rail/s 8 located on top of the lateral shoulder 3, so as to allow the support crossbeam 6 to move back and forth along the lateral shoulders 3 in the direction $d_1$.

The moving device 7, on the other hand, is preferably structured so as to be able to move the two resting slide-blocks 9 in a synchronized manner along the corresponding straight rails 8, so as to be able to move, on command, the whole support crossbeam 6 in direction $d_1$ while always keeping the crossbar parallel to itself and orthogonal to the vertical midplane of the machine.

In the example shown, in particular, the moving device 7 preferably includes a pair of linear electric motors, each of which is located on top of a respective lateral shoulder 3 and is capable of moving the corresponding resting slide-block 9 back and forth along the straight rails 8.

More in detail, each linear electric motor preferably comprises a fixed stator track and a travelling slide which is movable skimming the stator track. The stator track extends on top of the lateral shoulders 3, between the straight rails 8. The travelling slide, in turn, is rigidly fixed to the resting slide-block 9, so as to locally face and skim over a portion of the stator track.

However, in a less sophisticated embodiment, the resting slide-blocks 9 could be moved back and forth along the straight rails 8 via rack moving mechanism or via a ball-screw moving mechanism, in both cases operated by an electric or hydraulic motor.

With reference to FIG. 1, moreover the machine tool 1 comprises: a movable carriage 10 that is fixed to a lateral flank of support crossbeam 6 with the capability of freely moving along the support crossbeam 6 parallel to the longitudinal axis A of the crossbeam, i.e. in a second horizontal direction $d_2$ substantially perpendicular to the direction $d_1$ and to the vertical midplane of the machine; and a second, preferably electrically- or hydraulically-operated, electronically-controlled moving device 11 which is capable of moving, on command, the movable carriage 10 back and forth along the support crossbeam 6 in horizontal direction $d_2$.

Conventionally, the longitudinal axis A of support crossbeam 6 is furthermore substantially parallel to the Cartesian axis X, therefore the direction $d_2$ is substantially parallel to the same Cartesian axis.

More in detail, in the example shown, the machine tool 1 preferably has, on the lateral flank of support crossbeam 6, at least one and preferably a pair of straight rails 12, which extend horizontally and parallel to the crossbeam longitudinal axis A, preferably substantially for the whole length of support crossbeam 6. The movable carriage 10, in turn, is preferably coupled in axially sliding manner to the straight rail or rails 12.

The moving device 11, on the other hand, preferably includes a linear electric motor, which is located on the lateral flank of support crossbeam 6 and is capable of moving the movable carriage 10 back and forth along the straight rails 12, in the direction $d_2$.

More in detail, the linear electric motor of moving device 11 preferably comprises a fixed stator track and a travelling slide, which is movable skimming the stator track. The stator track extends on the lateral flank of support crossbeam 6, between the straight rails 12. The travelling slide, in turn, is rigidly fixed to the movable carriage 10, so as to locally face and skim over a portion of the stator track.

In a less sophisticated embodiment, also the movable carriage 10 could be moved back and forth along the straight rails 12 via rack moving mechanism or via a ball-screw moving mechanism, in both cases operated by an electric or hydraulic motor.

With particular reference to FIGS. 1 and 2, the machine tool 1 furthermore comprises: a substantially straight, head-holder beam 14 which is preferably made of metal material and is fixed to the movable carriage 10 with its longitudinal axis B substantially perpendicular to the crossbeam longitudinal axis A, and with the capability of sliding on the movable carriage 10 parallel to its longitudinal axis B; and a third, preferably electrically- or hydraulically-operated, electronically-controlled moving device 15 which is capable of moving, on command, the head-holder beam 14 relative to the movable carriage 10 parallel to the longitudinal axis B of head-holder beam 14, so as to be able to vary, on command, the height of the lower end of the head-holder beam 14 from the bedplate 2 beneath.

More in detail, the head-holder beam 14 is preferably fixed to the movable carriage 10 in a substantially vertical position, with the capability of axially moving relative to the movable carriage 10 in a direction $d_3$ substantially vertical and substantially perpendicular to the directions $d_1$ and $d_2$.

Conventionally the longitudinal axis B of head-holder beam 14 is thus substantially parallel to the Cartesian axis Z, therefore the direction $d_3$ is substantially parallel to the same Cartesian axis.

In the example shown, in particular, the head-holder beam 14 preferably basically consists of a large, straight tubular element with a rectangular or square cross-section, which is preferably made of metal material and is coupled to the movable carriage 10 in axially sliding manner.

The moving device 15, on the other hand, preferably comprises: a vertical-axis ball screw (not shown in the figures) which is interposed between the movable carriage 10 and the head-holder beam 14; and an electric motor (not shown in the figures), which is housed inside the movable carriage 10 and is adapted to drive the ball screw into rotation so as to be able to move axially, on command, the head-holder beam 14 for moving the lower end of the beam closer to or away from the bedplate 2 beneath, i.e. to move the head-holder beam 14 in direction $d_3$.

With reference to FIGS. 1, 2 and 3, the tool-holder head 30 of machine tool 1 is rigidly fixed to the lower end of head-holder beam 14, with the capability of rotating about a first reference axis preferably substantially parallel to and optionally also coincident with the longitudinal axis B of head-holder beam 14, and is provided with a movable tool-holder spindle that is capable of tilting about a second reference axis, which is inclined relative to the first reference axis.

In other words, the tool-holder head 30 is fixed to the distal end of the movable supporting structure of the machine with the capability of rotating/tilting the tool-holder spindle bout two further rotation axes inclined one to the other.

More in detail, the tool-holder head 30 of machine tool 1 comprises a preferably discoidal in shape, spindle-holder plate 16 which is fixed to the lower end of head-holder beam 14, so as to be coaxial to a reference axis C preferably substantially parallel to and optionally also coincident with the longitudinal axis B of head-holder beam 14. In addition, the head-holder plate 16 is fixed to the lower end of head-holder beam 14 with the capability of rotating relative to the head-holder beam 14 about reference axis C.

The tool-holder head 30 is furthermore provided with a fourth, preferably electrically- or hydraulically-operated, electronically-controlled moving device 17 which is capable of rotating, on command, the spindle-holder plate 16 about axis C, so as to change the angular position of the spindle-holder plate 16 relative to a given angular reference.

In the example shown, in particular, the moving device 17 is preferably accommodated inside the head-holder beam 14, behind the spindle-holder plate 16.

With reference to FIGS. 1, 2 and 3, the tool-holder head 30 furthermore includes a spindle assembly 18 which is rigidly fixed to the spindle-holder plate 16, so as to jut out underneath the head-holder beam 14 and reach the piece to be machined stationary on the piece-holder platform 5.

In other words, the spindle-holder plate 16 is located on the distal end of the movable supporting structure of the machine, and the spindle assembly 18 is rigidly fixed to the spindle-holder plate 16.

Preferably, the spindle assembly 18 is furthermore fixed to the spindle-holder plate 16 in a rigid and stable, though easy detachable manner.

With reference to FIGS. 1, 2 and 3, the spindle assembly 18 is further divided into a trunk or main body 19 and a tilting tool-holder spindle 20.

The trunk or main body 19 is rigidly coupled/couplable to the spindle-holder plate 16, so that it can selectively rotate about reference axis C together with the plate.

The tool-holder spindle 20, in turn, is mounted on the main body 19 with the capability of rotating/tilting about a second reference axis D that is inclined by a given angle relative to axis C and, hence, to the longitudinal axis B of head-holder beam 14.

More in detail, in the example shown, axis D is preferably substantially perpendicular to axis C and, hence, to the longitudinal axis B of head-holder beam 14.

The spindle assembly 18 clearly is provided with a further, preferably electrically- or hydraulically-operated, electronically-controlled moving device (not shown in the figures) that is preferably housed inside the main body 19 and is capable of rotating, on command, the tool-holder spindle 20 about axis D, so as to change the angular position of the spindle 20 relative to a given angular reference.

In the example shown, furthermore, the tool-holder spindle 20 is preferably an electrically-operated motor-spindle or the like, which is capable of driving the tool into rotation about its longitudinal axis.

With reference to FIG. 1, the machine tool 1 is additionally provided with an electronic control device 21, which commands the various moving members of the machine based on the signals arriving from a series of position sensors (not shown in the figures), which are properly placed/distributed on the movable supporting structure of machine tool 1, so as to automatically move and orient the tool-holder spindle 20 in the space above the piece-holder platform 5, in order to automatically carry out the previously scheduled piece machining operation/s.

In other words, the electronic control device 21 of machine tool 1 is preferably adapted to control the moving device 7, the moving device 11, the moving device 15, the moving device 17 and the moving device of tool-holder spindle 20 (or rather the servo-motors of spindle assembly 18 that control the position/tilt-angle of the tool-holder spindle 20), so as to move and orient the spindle 20, in a completely automatic manner, in the space above the piece-holder platform 5.

More in detail, the electronic control device 21 is preferably adapted to calculate/determine the current spatial position of the tool-holder spindle 20 and, hence, the spatial position of the tool currently mounted on the tool-holder spindle 20 of spindle assembly 18, based on the signals arriving from the aforesaid position sensors (not shown in the figures), and to command/operate the various moving devices of the machine, so as to move the tool-holder head 30 and its spindle 20 around the piece stationary on the piece-holder platform 5, in order to automatically carry out the previously-scheduled piece machining operation/s.

In the example shown, in particular, the machine tool 1 preferably includes: a first linear position transducer (not shown) that is capable of detecting/determining, in real time, the position of the support crossbeam 6 on the lateral shoulders 3; and/or a second linear position transducer (not shown) that is capable of detecting/determining, in real time, the position of the movable carriage 10 on the support crossbeam 6; and/or a third linear position transducer (not shown) that is capable of detecting/determining, in real time, the position of the head-holder beam 14 on the movable carriage 10; and/or a first encoder or other angular position transducer (not shown) that is capable of detecting/determining, in real time, the angular position of the spindle-holder plate 16 on the lower end of head-holder beam 14; and/or a second encoder or other angular position transducer (not shown) that is capable of detecting/determining, in real time, the angular position of the tool-holder spindle 20 on the main body 19 of spindle assembly 18.

The linear position transducers and the angular position transducers are components (position sensors) already largely used in the field of numerical-control machine tools, and therefore they won't be described any further.

Hence, the electronic control device 21 is preferably electronically connected to the different linear/angular position transducers listed above and is adapted to calculate/determine the spatial position and orientation of the tool-holder spindle 20 of tool-holder head 30 based on the signals arriving from said position transducers.

With reference to FIGS. 2 and 3, in addition the machine tool 1 moreover comprises one or more inclinometer microsensors 22, which are stably placed on the movable supporting structure of the machine and are adapted to measure/determine, preferably in a continuous manner, the tilt-angle of the piece on which they are mounted relative to an reference inertial plane (not shown) that is immobile/fixed in the space, i.e. has a constant attitude, and is preferably horizontal.

In other words, the inclinometer microsensor/s 22 is/are preferably structured so as to measure/determine, preferably in a continuous manner, the roll angle and/or the pitch angle of the piece on which they are mounted.

More in detail, the tool-holder head 30 is fixed on the distal end of the movable supporting structure of machine tool 1 and the inclinometer microsensor/s 22 is/are preferably placed on the distal end of the movable supporting structure of the machine, close to the tool-holder head 30, or rather to the spindle assembly 18.

Preferably the inclinometer microsensor/s 22 is/are MEMS (acronym of Micro Electro-Mechanical Systems) inclinometer sensor/s.

In further detail, with reference to FIGS. 2 and 3, the inclinometer microsensor/s 22, or rather the MEMS inclinometer sensor/s, are preferably placed on the lower end of head-holder beam 14, next to the spindle-holder plate 16, so that the reference inertial plane of the sensors is preferably locally substantially parallel to and/or substantially coincident with the lying and rotation plane of the spindle-holder plate 16.

In other words, the sensors reference inertial plane is locally substantially perpendicular to the longitudinal axis B of head-holder beam 14 and/or to the rotation axis C of the tool-holder head 30, or rather of the spindle-holder plate 16.

In the example shown, in particular, the inclinometer microsensor/s 22, or rather the MEMS inclinometer sensor/s, is/are preferably located on the slewing bearing 23 or other mechanical rolling support member that supports the spindle-holder plate 16 in axially rotatable manner.

In other words, the inclinometer microsensor/s 22 is/are preferably placed on the mechanical support member that connects the tool-holder head 30, or rather the spindle-holder plate 16, in freely rotatable manner to the distal end of the movable supporting structure of the machine.

More in detail, in the example shown, the machine tool 1 is preferably provided with two MEMS inclinometer sensors 22 that are preferably placed on the slewing bearing 23 or other mechanical support member, one orthogonal to the other, so as to detect the tilt relative to two horizontal reference axes orthogonal to one another.

The electronic control device 21, in turn, is electronically connected to said inclinometer microsensor/s 22, or rather to said MEMS inclinometer sensor/s, and is adapted to additionally command, during the machining of the piece, the moving members of the movable supporting structure of machine tool 1 based on the signal coming from the same inclinometer microsensor/s 22.

More in detail, the electronic control device 21 is programmed/configured so as to detect, during the machining of the piece and based in the signals arriving from the inclinometer microsensor/s 22, possible errors in the spatial orientation of the tool-holder head 30, or rather of the spindle-holder plate 16, relative to the calculated one and, as a consequence, possible errors in the spatial orientation of the tool-holder spindle 20 and of the tool mounted on the tool-holder spindle 20.

In addition, the electronic control device 21 is programmed/configured so as to command/operate the machine-tool moving members, i.e. the moving devices 7, 11, 15, 17 and the servo-motors of tool-holder spindle 20, based on the signals arriving from the inclinometer microsensor/s 22, so as to compensate/correct, during the machining of the piece and until physically possible, the possible error in the spatial orientation of the tool-holder head 30, or rather of the spindle-holder plate 16.

In other words, the electronic control device 21 is programmed/configured so as to correct/change, in real time during the machining of the piece, the programmed spatial position and orientation of the tool-holder spindle 20 in order to compensate a possible error in the spatial position and/or in the orientation of the tool-holder head so as to always keep the tool-holder spindle 20, or rather the tool fixed on the spindle 20 (tool vector v), substantially in the correct position/position planned by the machining, regardless of possible deformations present in the movable supporting structure of machine tool 1.

Preferably, the inclinometer microsensor/s 22, or rather the MEMS inclinometer sensor/s, moreover communicate/s with the electronic control device 21 via wireless signals.

Finally, the inclinometer microsensor/s 22, or rather the MEMS inclinometer sensor/s, preferably have a precision exceeding one thousandth of a degree.

In the example shown, in particular, the inclinometer microsensor/s 22 preferably is/are MEMS inclinometer sensor/s produced by the company SHANGHAI VIGOR TECHNOLOGY DEVELOPMENT Co. Ltd., by the company JEWELL INSTRUMENTS LLC, or by the Italian-French corporation ST MICROELECTRONICS.

Being electronic components readily available on the market, the aforesaid MEMS inclinometer sensors will not be described any further.

The operation of machine tool 1 will now be described assuming, for example, that one side of the head-holder beam 14 is lighted by direct sunlight, whereas the remaining part of the machine is in the shadow.

Figure 4:
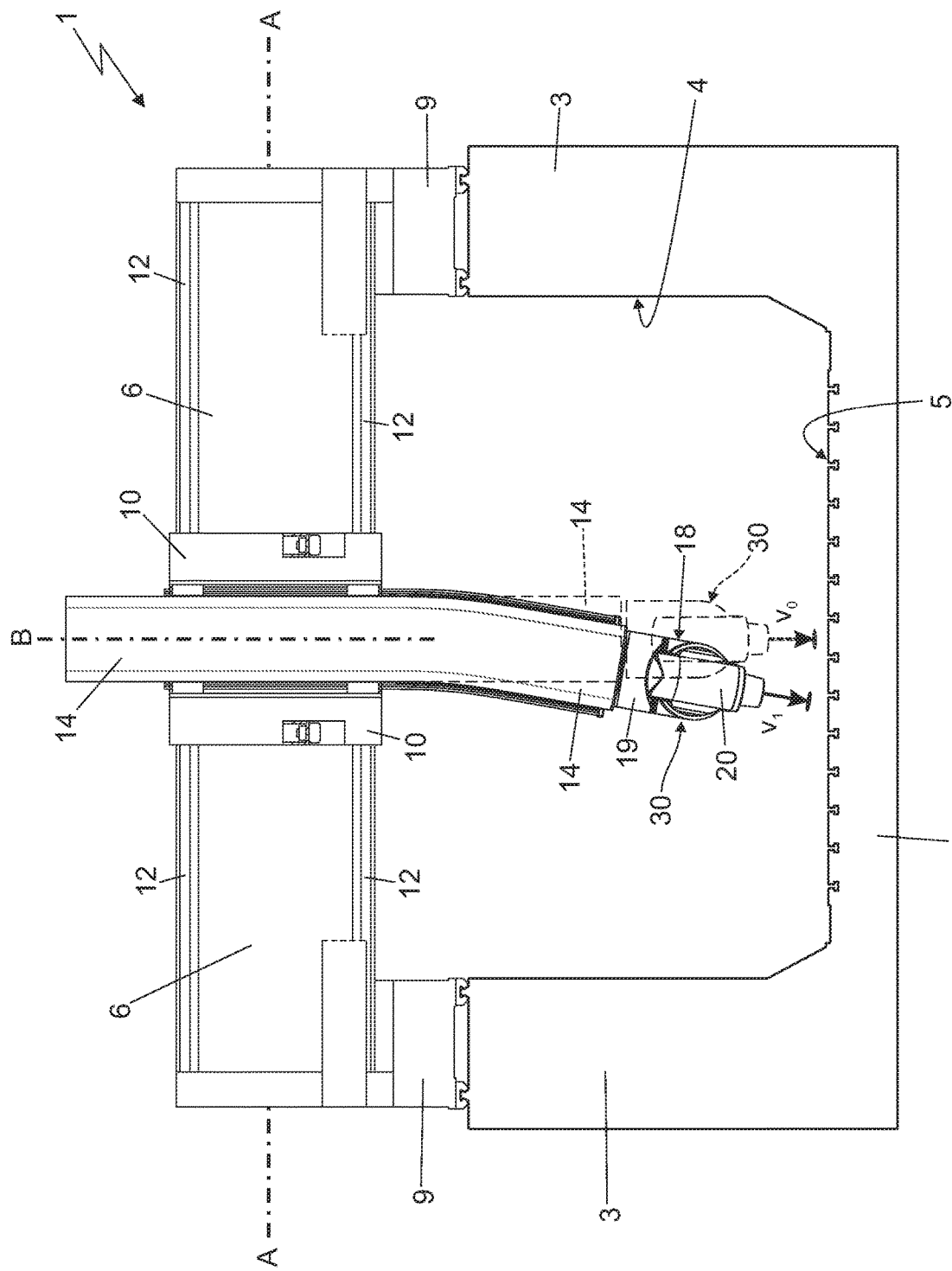
FIG. 4 is a front view, with parts removed for sake of clarity, of the machine tool shown in FIG. 1, temporarily deformed due to unexpected thermal expansions.

With reference to FIG. 4, the thermal expansions due to the local temperature increase affecting the flank of the head-holder beam 14 cause a twist (suitably heightened in the figure) of the head-holder beam 14 that obviously changes the spatial position and the orientation of the tool-holder head 30 and, consequently, also the spatial position and orientation of the tool-holder spindle 20 and of the tool currently mounted on the tool-holder spindle 20.

In other words, the tool vector v shifts from the correct position $v_0$ to the wrong position $v_1$.

In these conditions, assuming that no inclinometer sensors 22 are used, the electronic control device 21 is unable of detecting possible errors in the positioning of the tool and, as a consequence, it will carry out the scheduled machining operations without taking into account the error in the actual spatial position and/or orientation of the tool (tool vector v), thus producing a piece with considerable dimensional errors.

Figure 5:
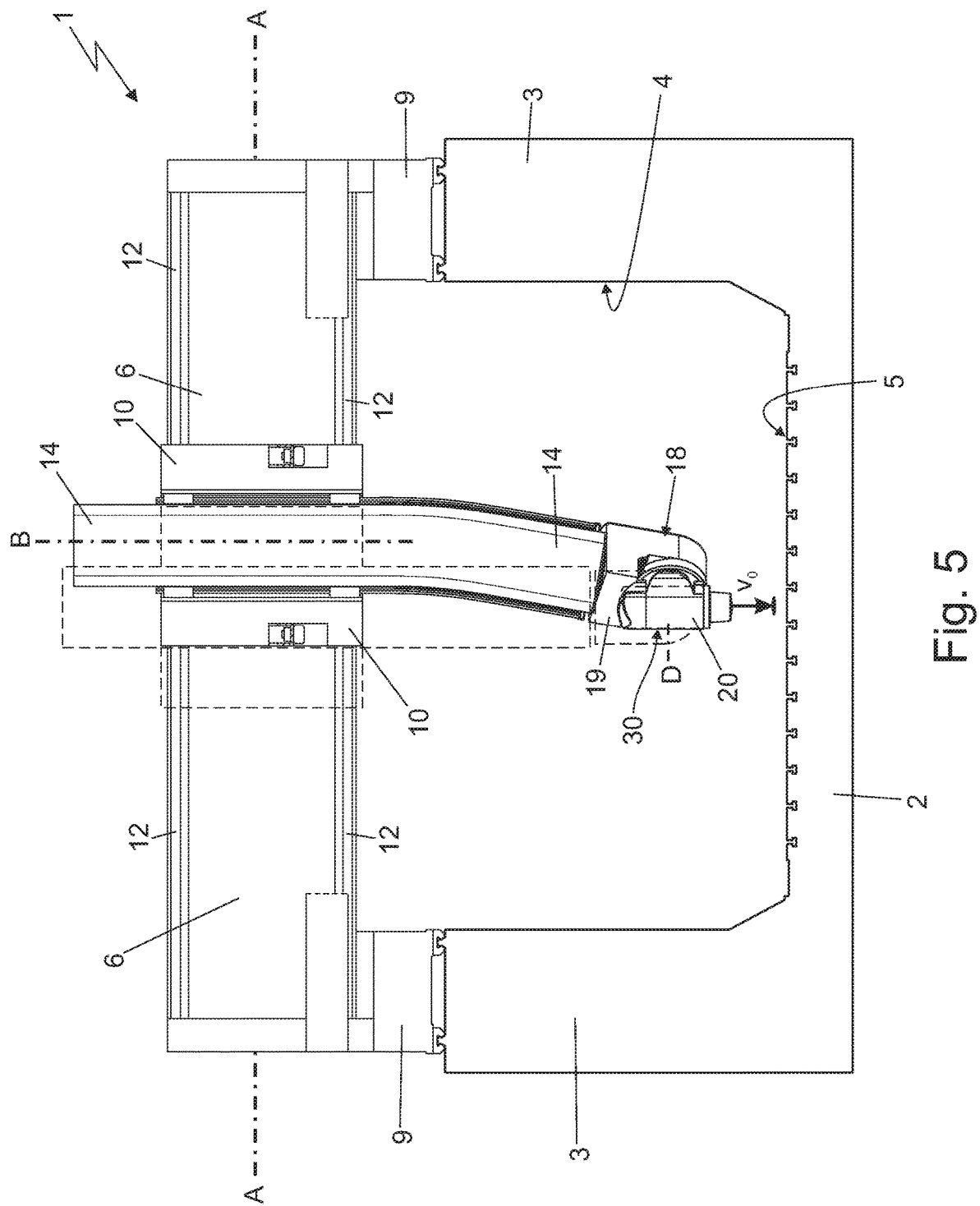

With reference to FIG. 5, however, thanks to the signals arriving from the inclinometer sensors 22, the electronic control device 21 instead detects that the tool-holder head 30, or rather the head-holder plate 16, is currently not in the correct spatial position and orientation, even though the traditional position sensors say otherwise, and thus commands the machine-tool moving members so as to correct/compensate, in real time, the error in the spatial position and/or in the orientation of the tool-holder head 30, in order to keep, during the machining of the piece, the tool-holder spindle 20 and the tool mounted on the tool-holder spindle 20 in the spatial position and orientation planned for the machining currently carried out.

In other words, the electronic control device 21 commands the machine-tool moving members (namely the moving devices 7, 11, 15, 17 and the servo-motors of tool-holder spindle 20) so as to keep the tool vector v associated to the tool currently mounted on tool-holder spindle 20 always in the correct position $v_0$, regardless of the deformations possibly present in the supporting structure bearing the tool-holder head 30.

The advantages associated to the presence of the inclinometer microsensors/s 22 on the head-holder beam 14, next to the tool-holder head 30, or rather to the spindle-holder plate 16, are remarkable.

The presence of the inclinometer microsensor/s 22 immediately behind the spindle-holder plate 16, and hence next to the spindle assembly 18, allows the electronic control device 21 to realize that the tool-holder head 30 is not in the correct/planned position, and then to adjust/correct, in real time, the position of the tool-holder spindle 20 and of the tool integral thereto around the piece to be machined, so as to eliminate or anyway minimize those machining errors due to possible thermal deformations of the supporting structure of the machine.

In other words, the machine tool 1 works correctly even when its supporting structure is deformed, for example due to unforeseen thermal expansions.

The inclinometer microsensors 22, in fact, measure physical quantities that are already affected/altered by the thermal expansions which the supporting structure of the machine is usually subjected to. Capability instead barred to the position sensors mounted on the supporting structure of the machine.

As a consequence, the electronic control device 21 is able to immediately recognize possible errors in the spatial orientation of the tool-holder head 30, or rather of the spindle-holder plate 16, and to perform the proper corrections when operating the various moving members of the movable supporting structure that, during the machining of the piece, move the tool-holder head 30 and its tool-holder spindle 20 around the piece to be machined.

Clearly the movable supporting structure of machine tool 1 may deform also due to causes different from unforeseen thermal expansions, such as, for example, a light and localized yielding of the foundations bearing the bedplate 2, a small collision with the piece to be machined or even excess mechanical wear.

Furthermore, the use of MEMS inclinometer sensors 22 allows the sensors to be placed close to the tool-holder head 30, or rather to the spindle-holder plate 16, where the available space is very small, thus allowing to further reduce the errors caused by the thermal expansions of the metal components.

In addition, the presence of the inclinometer microsensors 22 allows the electronic control device 21 to monitor the spatial orientation of the tool-holder spindle 20 during the machining of the piece and to immediately stop/interrupt the machining currently carried out in case, during the machining, the deviation of the position and/or orientation of the tool currently mounted on the tool-holder spindle 20 with respect to the planned spatial position and/or orientation exceeds a given maximum threshold.

Optionally the electronic control device 21 could be furthermore programmed/configured so as to simultaneously move the tool-holder spindle 20, or rather the tool currently mounted on spindle 20, away from the piece being machined, in order to preserve the structural integrity thereof and, if necessary, so as to start a machine re-calibration procedure.

Last but not least, the presence of the inclinometer microsensors 22 close to the spindle-holder plate 16 allows some parts of the machine to be simplified.

Numerical control bridge milling machines currently on the market, in fact, are provided with a series of cooling systems that are placed on the support crossbeam, on the head-holder beam and on the other large-sized metal pieces of the machine supporting structure, and that have the function of containing, during machine operation, the thermal expansions the pieces are subjected to.

The inclinometer microsensors 22 allow to detect and correct, in real time, possible alterations/deviations of the spatial position of the tool-holder head 30, or rather of the spindle-holder plate 16, regardless of the environmental conditions in which the machine tool operates.

As a consequence, in machine tool 1, it is possible to reduce or anyway simplify the cooling systems of the machine supporting structure, with the significant costs reduction that this entails.

It is finally clear that changes and variations may be made to the numerical-control machine tool 1 described above can, without for this reason going beyond the scope of protection of the present invention.

For example, machine tool 1 may lack the piece-holder platform 5.

Figure 6:
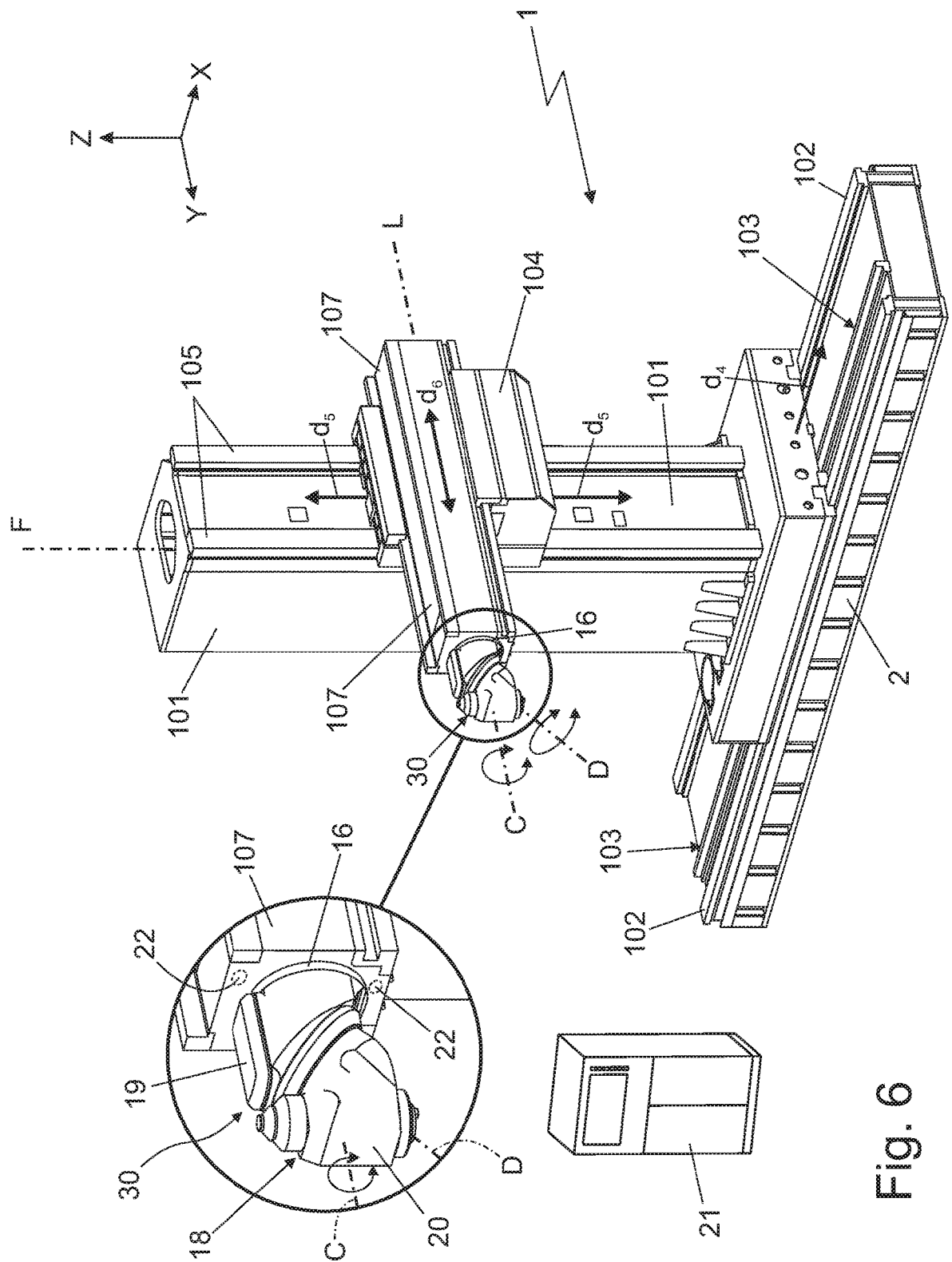
FIG. 6 is a perspective view of a different embodiment of the machine tool shown in FIG. 1, with parts removed for sake of clarity.

With reference to FIG. 6, in a different embodiment of machine tool 1, furthermore the machine supporting structure preferably comprises: a large movable support column 101, preferably substantially parallelepiped in shape, which raises cantilevered from the bedplate 2 in a substantially vertical direction, i.e. parallel to Cartesian axis Z, and is capable of moving, along specific straight rail 102 present on bedplate 2, in a horizontal direction $d_4$ substantially parallel to Cartesian axis X and locally perpendicular to the longitudinal axis F of support column 101; and a preferably electrically- or hydraulically-operated, moving device 103 which is adapted to move, on command, the support column 101 back and forth along the bedplate 2 in direction $d_4$.

The movable supporting structure of machine tool 1 moreover comprises: a movable slide 104 which is mounted slidable on a series of straight guides 105 that extend on a lateral flank of support column 101 parallel to the column longitudinal axis F, i.e. vertically, so as to be able to freely move along the body of support column 101 in a direction $d_5$ parallel to the column longitudinal axis F, i.e. in a substantially vertical direction parallel to Cartesian axis Z; and a second, preferably electrically- or hydraulically-operated, moving device (not shown) which is adapted to move, on command, the movable slide 104 upwards and downwards along the support column 101, in direction $d_5$, so as to change the height of the movable slide 104 from the ground.

Still with reference to FIG. 6, in addition in this embodiment the movable supporting structure of machine tool 1 also comprises: a long, straight head-holder beam 107 preferably substantially prismatic in shape, that extends cantilevered and horizontally from slide 104 orthogonally to the column longitudinal axis F and to direction $d_5$, i.e. while remaining substantially parallel to Cartesian axis Y, and is coupled in a sliding manner to the slide 104, so as to be able to move in a direction $d_6$ locally parallel to the longitudinal axis L of head-holder beam 107, i.e. parallel to Cartesian axis Y; and a third, preferably electrically- or hydraulically-operated, moving device (not shown) which is adapted to move, on command, the head-holder beam 107 back and forth on slide 104, in direction $d_6$, so as to vary, on command, the length of the portion of head-holder beam 107 jutting out from the support column 101 parallel to the ground.

Even in this embodiment, the spindle-holder plate 16 of tool-holder head 30 is fixed in axially rotatable manner to the distal end of head-holder beam 107, with the reference axis C preferably substantially parallel to and, optionally, also coincident with the beam longitudinal axis L. Also in this case, the head-holder beam 107 is hollow and the moving device of plate 16 (not shown in the figure) is preferably accommodated inside the head-holder beam 107.

Clearly the spindle assembly 18 is fixed to the spindle-holder plate 16 so as to project cantilevered from the head-holder beam 107.

With reference to FIG. 6, in this embodiment, however, the tool-holder spindle 20 of spindle assembly 18 is preferably mounted on main body 19 with the capability of rotating/tilting about a second reference axis D that is preferably, though not necessarily, inclined by about 45° relative to the axis C and, hence, to the longitudinal axis L of head-holder beam 107.

Finally, in this embodiment, machine tool 1 preferably lacks the piece-holder platform 5 and, instead, comprises a movable piece-holder table (not shown) which is located beside the support column 101, and is structured so as to firmly hold the metal piece to be processed, usually also with the capability of rotating, on command, the metal piece about one or more reference axes orthogonal to one another.

Even in this embodiment, the machine tool 1 is provided with one or more inclinometer microsensors 22, or rather with one or more MEMS inclinometer sensors, that are placed/fixed on the distal end of head-holder beam 107, preferably close to the spindle-holder plate 16 of tool-holder head 30, and are adapted to measure/determine, preferably in a continuous manner, the tilt of the spindle-holder plate 16 relative to a immobile reference inertial plane (not shown) that, in this case, is preferably vertical.

Similarly to the previous embodiment, the electronic control device 21 communicates with the inclinometer micro-sensor/s 22, or rather with the MEMS inclinometer sensors, located on the distal end of head-holder beam 107, so as to detect possible errors/deviations of the tool-holder head relative to the theoretical spatial position, or rather of the spindle-holder plate 16 present on the distal end of head-holder beam 107.

The invention claimed is:

1. A numerical-control machine tool (1) comprising: a tool-holder head (30) which is provided with a tool-holder spindle (20) and is capable of rotating/tilting said tool-holder spindle (20) about two different rotation axes (C, D) inclined to one another; a movable supporting structure (2, 3, 6, 10, 14; 101, 104, 107) that supports the tool-holder head (30) and is provided with moving members (7, 11, 15) adapted to move, during machining of the piece, the tool-holder head (30) in the space surrounding the piece to be machined; an electronic control device (21) that commands the moving members of the movable supporting structure (7, 11, 15) and the moving members of the tool-holder head (17) so as to move, during the machining of the piece, the tool-holder head (30) and the tool-holder spindle (20) in the space around the piece to be machined in order to carry out the planned machining in automatic manner; and one or more inclinometer micro sensors (22) that are located on the movable supporting structure (2, 3, 6, 10, 14; 101, 104, 107) of the machine tool, next to said tool-holder head (30), and are adapted to measure/determine the tilt of the element on which the same one or more inclinometer microsensors are mounted, relative to a reference inertial plane immobile in the space;

the machine tool being characterised in that the electronic control device (21) is electronically connected to said one or more inclinometer microsensors (22), and is additionally programmed/configured to command the moving members of the movable supporting structure (7, 11, 15) and the moving members of the tool-holder head (17) also based on the signals arriving from said one or more inclinometer microsensors (22), so as to correct/change, in real time during the machining of a piece, the programmed spatial position and orientation of the tool-holder spindle (20) in order to compensate a possible error in the spatial position and/or orientation of the tool-holder head (30) resulting from a deformation of the movable supporting structure (2, 3, 6, 10, 14; 101, 104, 107) of the machine tool.

2. Machine tool according to claim 1, wherein the tool-holder head (30) is fixed to the distal end of said movable supporting structure (2, 3, 6, 10, 14; 101, 104, 107), and said one or more inclinometer microsensors (22) are located on the same distal end of the movable supporting structure (2, 3, 6, 10, 14; 101, 104, 107).

3. Machine tool according to claim 2, wherein the tool-holder head (30) comprises: a spindle-holder plate (16) which is fixed to the distal end of the movable supporting structure (2, 3, 6, 10, 14; 101, 104, 107) with the capability of rotating about a first reference axis (C); first moving means (17) adapted to rotate, on command, said spindle-holder plate (16), so as to change the angular position of the spindle-holder plate (16) relative to a given angular reference; and a spindle assembly (18) which is rigidly fixed to said spindle-holder plate (16) and is divided into a main body (19) and into a tilting tool-holder spindle (20).

4. Machine tool according to claim 3, wherein the main body (19) is rigidly coupled/couplable to said spindle-holder plate (16), so as to be able to selectively rotate about said first reference axis (C) together with the same plate.

5. Machine tool according to claim 3, wherein the tool-holder spindle (20) is mounted on the main body (19) with the capability of rotating/tilting about a second reference axis (D) inclined by a given angle relative to said first reference axis (C).

6. Machine tool according to claim 3, wherein said one or more inclinometer micro sensors (22) are placed next to said spindle-holder plate (16).

7. Machine tool according to the claim 6, wherein said one or more inclinometer micro sensors (22) are placed on a mechanical support member (23) that connects the spindle-holder plate (16) in a free rotatable manner to the movable supporting structure (2, 3, 6, 10, 14; 101, 104, 107).

8. Machine tool according to the claim 7, wherein said one or more inclinometer microsensors (22) are placed on the mechanical support member (23) that connects the spindle-holder plate (16) in free rotatable manner to the movable supporting structure (2, 3, 6, 10, 14; 101, 104, 107), so that the reference inertial plane is substantially coincident with the plane on which said spindle-holder plate (16) lies and rotates.

9. Machine tool according to claim 1, wherein said one or more inclinometer microsensors (22) communicate with the electronic control device (21) via wireless signals.

10. Machine tool according to claim 1, wherein said inclinometer microsensor/s (22) is/are Micro Electro-Mechanical Systems (MEMS inclinometer sensors.

11. Machine tool according to claim 1, wherein the movable supporting structure (2, 3, 6, 10, 14; 101, 104, 107) comprises: a support crossbeam (6) that extends substantially horizontally and is capable of moving horizontally in a first horizontal direction (d1) substantially perpendicular to its longitudinal axis (A); a movable carriage (10) that is capable of moving along the support crossbeam (6) parallel to the crossbeam longitudinal axis (A); and a head-holder beam (14) that is fixed to the movable carriage (10) with its longitudinal axis (B) substantially perpendicular to the crossbeam longitudinal axis (A) and is capable of sliding on the movable carriage (10) parallel to its longitudinal axis (B).

12. Machine tool according to claim 11, wherein the head-holder beam (14) is fixed to the movable carriage (10) in a substantially vertical position.

13. Machine tool according to claim 11, wherein the two ends of the support crossbeam (6) rest in sliding manner on a pair of substantially straight, lateral shoulders (3) that raise/project vertically from a bedplate (2) and extend horizontally over the bedplate (2) one beside the other, so as to form/delimit a longitudinal corridor (4).

14. Machine tool according to claim 11, wherein the spindle-holder plate (16) is fixed to an end of said head-holder beam (14, 107).

15. Machine tool according to claim 14, wherein the first reference axis (C) is substantially parallel to or coincident with the longitudinal axis (B, L) of the head-holder beam (14, 107).

16. Machine tool according to claim 1, wherein the movable supporting structure (2, 3, 6, 10, 14; 101, 104, 107) comprises: a vertical support column (101) that is capable of moving horizontally in a second horizontal direction (d4) substantially perpendicular to its longitudinal axis (F); a movable slider (104) that is capable of moving along the support column (101) parallel to the column longitudinal axis (F); and a head-holder beam (107) that is fixed on the movable slider (104) with its longitudinal axis (L) substantially perpendicular to the column longitudinal axis (F) and is capable of sliding on the movable slider (104) parallel to its longitudinal axis (B).

17. Machine tool according to claim 1, wherein the reference inertial plane of said one or more inclinometer microsensors (22) is substantially horizontal or substantially vertical.

* * * * *